(12) United States Patent
Birchbauer et al.

(10) Patent No.: US 10,621,742 B2
(45) Date of Patent: Apr. 14, 2020

(54) METHOD FOR PRODUCING A DEPTH MAP

(71) Applicant: Siemens Aktiengesellschaft, Munich (DE)

(72) Inventors: Josef Alois Birchbauer, Seiersberg (AT); Stefan Wakolbinger, Graz (AT)

(73) Assignee: Siemens Aktiengesellschaft, Munich (DE)

( * ) Notice: Subject to any disclaimer, the term of this patent is extended or adjusted under 35 U.S.C. 154(b) by 123 days.

(21) Appl. No.: 16/060,748

(22) PCT Filed: Dec. 7, 2016

(86) PCT No.: PCT/EP2016/080055
§ 371 (c)(1),
(2) Date: Jun. 8, 2018

(87) PCT Pub. No.: WO2017/097827
PCT Pub. Date: Jun. 15, 2017

(65) Prior Publication Data
US 2018/0357777 A1    Dec. 13, 2018

(30) Foreign Application Priority Data
Dec. 10, 2015   (DE) .......................... 10 2015 224 854

(51) Int. Cl.
*G06T 7/55*  (2017.01)
*G06T 7/593*  (2017.01)
(Continued)

(52) U.S. Cl.
CPC ................ *G06T 7/55* (2017.01); *G01C 11/08* (2013.01); *G01S 19/26* (2013.01); *G06T 7/593* (2017.01);
(Continued)

(58) Field of Classification Search
None
See application file for complete search history.

(56) References Cited

U.S. PATENT DOCUMENTS

| 5,606,627 A | 2/1997 | Kuo | |
|---|---|---|---|
| 9,367,743 B1 * | 6/2016 | Haglund | .............. G06K 9/0063 |

(Continued)

FOREIGN PATENT DOCUMENTS

| CN | 103679804 | * 12/2013 |
|---|---|---|
| DE | 102008043445 | 5/2010 |

(Continued)

OTHER PUBLICATIONS

Christine Grahl, 3D Mapping of Underground Utilities, https://www.pobonline.com/articles/98346-d-mapping-of-underground-utilities, Jul. 21, 2011 (Year: 2011).*

(Continued)

*Primary Examiner* — Andrae S Allison
(74) *Attorney, Agent, or Firm* — Cozen O'Connor

(57) ABSTRACT

A method for producing a depth map from a detection region of the Earth's surface, a detection region being arranged in an underground pipeline, wherein the method includes recording at least one image sequence via at least one camera, determining the position and orientation of the camera corresponding to each individual recording, determining a spatial position and orientation of the underground pipeline arranged in the detection region, producing the depth map of the detection region via a plane sweep method based on the individual recordings and the associated camera positions, where the maximum depth region of the plane sweep method is subdivided into a total of N sections in an adaptive manner, i.e., in accordance with a predetermined minimum layer thickness for the ground covering the underground pipeline, via a predetermined number of planes (Continued)

spaced differently from one another and extending parallel with respect to one another.

13 Claims, 2 Drawing Sheets

(51) Int. Cl.
*G01C 11/08* (2006.01)
*G06T 7/73* (2017.01)
*G01S 19/26* (2010.01)

(52) U.S. Cl.
CPC ...... *G06T 7/74* (2017.01); *G06T 2207/10016* (2013.01); *G06T 2207/10032* (2013.01); *G06T 2207/30184* (2013.01)

(56) References Cited

U.S. PATENT DOCUMENTS

| | | | |
|---|---|---|---|
| 9,646,415 B2* | 5/2017 | Hanson | G06K 9/0063 |
| 2003/0235344 A1 | 12/2003 | Kang et al. | |
| 2005/0156776 A1* | 7/2005 | Waite | G01V 3/12 |
| | | | 342/22 |
| 2006/0072851 A1 | 4/2006 | Kang et al. | |
| 2012/0179432 A1* | 7/2012 | Wivell | G06T 11/001 |
| | | | 703/2 |
| 2013/0185035 A1* | 7/2013 | Andrade | G06T 17/00 |
| | | | 703/2 |
| 2014/0368373 A1* | 12/2014 | Crain | G01S 5/02 |
| | | | 342/5 |
| 2014/0379179 A1* | 12/2014 | Goossen | G08G 5/02 |
| | | | 701/18 |
| 2015/0188482 A1* | 7/2015 | Berkowitz | H02J 3/383 |
| | | | 320/101 |
| 2016/0321818 A1* | 11/2016 | Shorter | G06K 9/00476 |
| 2016/0356665 A1* | 12/2016 | Felemban | G01M 3/2807 |
| 2019/0154434 A1* | 5/2019 | Birchbauer | G01B 21/08 |
| 2019/0204814 A1* | 7/2019 | Birchbauer | G05B 19/41875 |
| 2019/0205644 A1* | 7/2019 | Birchbauer | G06T 17/05 |

FOREIGN PATENT DOCUMENTS

| | | | |
|---|---|---|---|
| JP | 5682060 | * | 7/2012 |
| KR | 101350778 | * | 1/2014 |

OTHER PUBLICATIONS

Jurado, Juan Manuel, Lidia Ortega Alvarado, and Francisco R. Feito. "3D underground reconstruction for real-time and collaborative virtual reality environment." (2018). (Year: 2018).*
C. Lee, J. Oh, C. Hong and J. Youn, "Automated Generation of a Digital Elevation Model Over Steep Terrain in Antarctica From High-Resolution Satellite Imagery," in IEEE Transactions on Geoscience and Remote Sensing, vol. 53, No. 3, pp. 1186-1194, Mar. 2015. (Year: 2015).*
Oh, Jaehong, and Changno Lee. "Extraction of digital elevation model using stereo matching with slope-adaptive patch transformation." Ksce Journal of Civil Engineering 20.7 (2016): 2902-2909. (Year: 2016).*
G. L. K. Morgan, J. G. Liu and H. Yan, "Sub-Pixel Stereo-Matching for DEM Generation from Narrow Baseline Stereo Imagery," IGARSS 2008—2008 IEEE International Geoscience and Remote Sensing Symposium, Boston, MA, 2008, pp. III-1284-III-1287. (Year: 2008).*
Yan et al, Three-Dimensional Data Modelling for Underground Utility Network Mapping, Remote Sensing and Spatial Information Sciences, vol. XLII-4, 2018, ISPRS TC IV Mid-term Symposium "3D Spatial Information Science—The Engine of Change", Oct. 1-5, 2018, (Year: 2018).*
Yan, Jingya, et al. "Towards an Underground Utilities 3D Data Model for Land Administration." Remote Sensing 11.17 (2019): 1957. (Year: 2019).*
Gallup David et al: "Real-Time Plane-Sweeping Stereo with Multiple Sweeping Directions"; IEEE Conference on Computer Viosion and Pattern Recognition Jun. 17-22, 2007; IEEE Xplore [online]; DOI: 10.1109/CVPR.2007.383245; pp. 1-8.
Yihui Lu et al: "Stereo Image Matching Using Robust Estimation and Image Analysis Techniques for DEM Generation", XP055312468, Gefunden im Internet: URL:http://www.isprs.org/proceedings/XXXIII/congress/part3/520 XXXIII-part3.pdf; [gefunden am Oct. 20, 2016]; Chapter [0003];; 2000.
Nozick Vincent et al: "Plane-Sweep Algorithm: Various Tools for Computer Vision"; IEICE Technical Report; PRMU 107(539); Mar. 2008; pp. 87-94;; 2008.

* cited by examiner

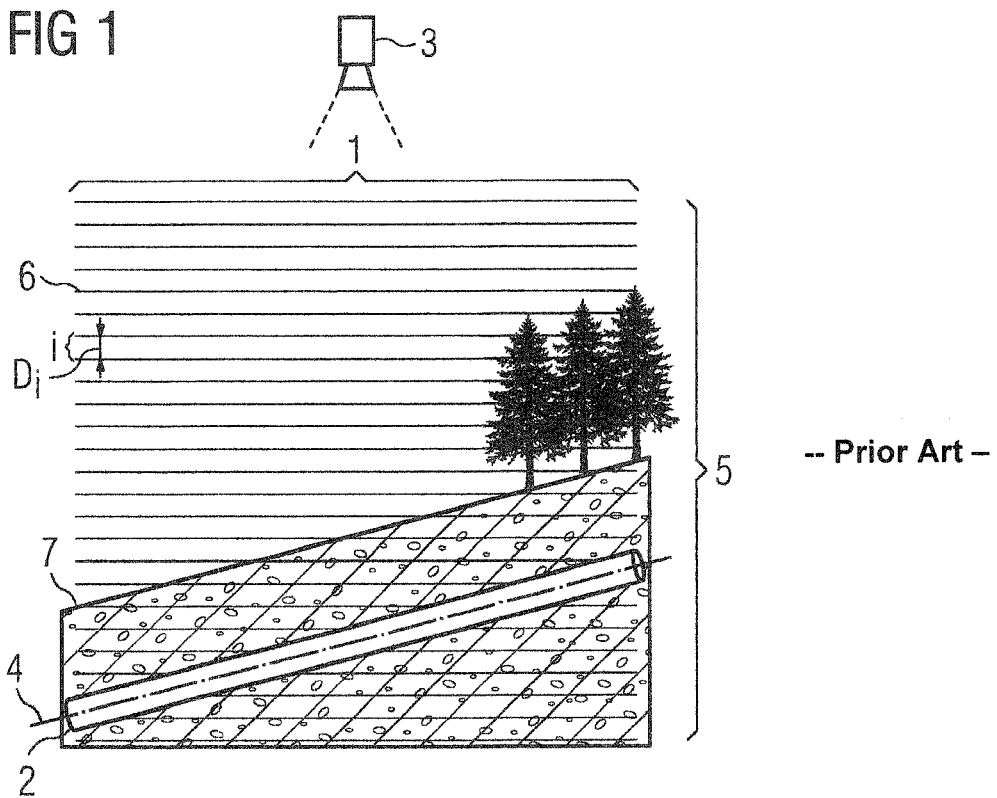
FIG 1 — Prior Art —
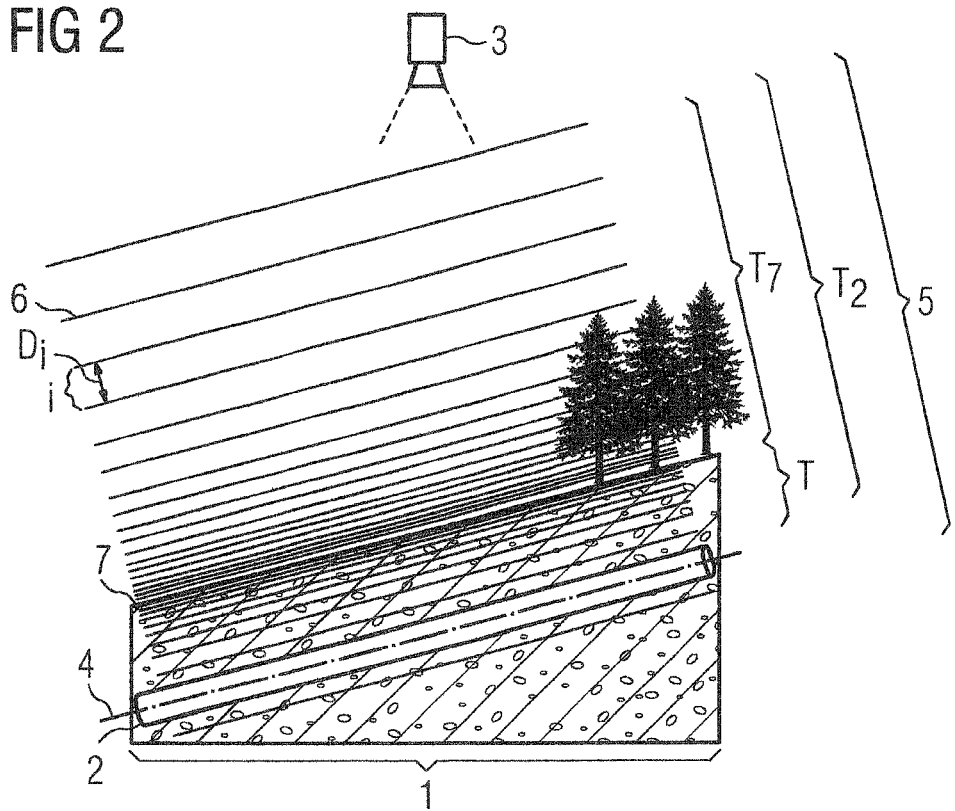
FIG 2

METHOD FOR PRODUCING A DEPTH MAP

CROSS-REFERENCE TO RELATED APPLICATIONS

This is a U.S. national stage of application No. PCT/EP2016/080055 filed Dec. 7, 2016. Priority is claimed on German Application No. 102015224854.2 filed Dec. 10, 2015, the content of which is incorporated herein by reference in its entirety.

BACKGROUND OF THE INVENTION

1. Field of the Invention

The present invention relates to a method for compiling a depth map of an acquisition zone of the earth's surface where, an underground pipeline is arranged in the acquisition zone.

2. Description of the Related Art

Gas and oil pipelines laid underground must be covered by a statutory minimum layer depth of soil. Compliance with this layer thickness must be checked at regular intervals of time by the pipeline operator. The minimum layer thickness has conventionally to be determined to an accuracy in the one-digit centimeter range.

Compared to the currently conventional but very costly helicopter inspections, use is increasingly being made in this connection of "UAVs", or Unmanned Aerial Vehicles, equipped with camera technology. These drones can be used for purposes ranging from identifying changes in the soil to detecting leaks. In the course of a flight, either a Digital Surface Model (DSM) or a Digital Terrain Model (DTM) may be compiled from overlapping aerial captures of an acquisition zone of the earth's surface to be monitored. While a DSM constitutes a representation of the earth's surface (pedosphere/atmosphere interface) together with all the objects located thereon (buildings, roads, vegetation, etc.), the height information of a DTM relates to the earth's surface itself. A DTM therefore represents an ideal basis for geometric change identification within the acquisition zone to be monitored.

Measurement of the actual layer thickness of the soil covering the underground pipeline may be understood as being a sub-problem of change identification. If measurement of the actual layer thickness is to be reliable and meaningful, the three-dimensional resolution of the DTM has to be very accurate, however. In this connection, photogrammetric methods initially yield 3D point clouds of not very high density. In a subsequent method step, dense depth maps may later be generated from such incomplete data structures using "dense matching".

A plurality of methods are known from the prior art for directly generating such depth maps from a plurality of overlapping images or image sequences ("multiview stereo"). One such method, which may be considered particularly advantageous for the purposes of the present invention, is based on the plane-sweep principle, see in this regard, for instance, "Plane-Sweep Algorithm: Various Tools for Computer Vision", Vincent Nozick, François de Sorbier and Hideo Saito, IEICE Technical Report, PRMU 107(539), pages 87-94, March 2008. The plane-sweep principle involves quantizing, i.e., discretizing, the continuous range of all possible depth values and progressively determining the most probable associated depth value for each (x,y) duple of the depth map. This may proceed, for example, by checking all possible quantized, i.e., discrete, depth values with regard to a correlation criterion ("photo consistency").

The depth resolution of a DTM compiled in this way is thus dependent on the quantizing interval of the plane-sweep method. Plane-sweep methods according to the prior art conventionally provide quantization in which the continuous depth range is discretized by a predetermined number of planes extending parallel to one another. The maximum number of these planes is limited by the computing power and/or the storage capacity of a computing unit that performs the calculations for generating the depth map and is conventionally between 200 and 300. The layer thickness of the soil covering the underground pipeline has to be measured with an accuracy in the one-digit centimeter range and both the available cadastral data from pipeline laying and also the determination of the positions and orientations of the cameras for the frames suffer from a degree of inaccuracy. In view of this, the spacing of the individual planes should amount to around 1 cm.

Thus, in the context of conventional plane-sweep methods, a depth range of merely 2 to 3 m can be covered.

SUMMARY OF THE INVENTION

In view of the foregoing, it is therefore an object of the present invention to provide a method for compiling a depth map of an acquisition zone of the earth's surface, with which method a significantly greater depth range can be covered, while complying with the prescribed measuring accuracy for a layer thickness measurement, than is the case with the conventional methods.

It is a further object of the present invention to provide a method for compiling a depth map, which depth map may subsequently be used both for layer thickness measurement of the soil covering the underground pipeline arranged in the acquisition zone and also for assessing other scene contents present in the acquisition zone, such as trees, buildings, vehicles, or people. The intention is to avoid multiple calculations and allow more memory-efficient use of available data.

These and other objects and advantages are achieved in accordance with the invention by a method for compiling a depth map of an acquisition zone of the earth's surface, in which acquisition zone an underground pipeline is arranged, and includes the steps of capturing at least one image sequence using at least one camera, where the image sequence comprises a plurality of at least partly overlapping individual captures of the acquisition zone, and determining the position and orientation of the camera corresponding to each individual capture.

The method includes the additional steps of determining a preferably averaged spatial position and orientation of the underground pipeline arranged in the acquisition zone from reference data, and compiling the depth map of the acquisition zone using a plane-sweep method based on the individual captures and the respectively associated camera poses.

In accordance with the method of the invention, the maximum depth range of the plane-sweep method is subdivided adaptively, namely as a function of a predetermined minimum layer thickness for the soil covering the underground pipeline, into a total of N portions via a predetermined number of planes spaced differently from one another and extending parallel to one another, whereby a predetermined portion height is assigned to each individual one of the N portions, and the orientation of the planes extends parallel to the orientation of the underground pipeline.

Here, the method in accordance with the invention differs from conventional methods in that the maximum depth range that must be taken into account in the method for compiling the depth map is not quantized homogeneously or isometrically but rather is subdivided adaptively into a certain number of individual portions as a function of the specified minimum layer thickness that the soil covering the underground pipeline is supposed to have, where the portion heights of the individual portions are selected to be of different magnitudes. In this way, the method may be adapted as required respectively such that, in a region in which an accurate measurement has to be performed, high-resolution quantization is performed while, in regions in which accurate measurement is unnecessary or not of interest, a low resolution can be selected to save resources for evaluation of the depth map and for performing further calculations.

Capture of the image sequence serving to compile the depth map is performed particularly favorably in accordance with the invention using camera technology mounted on UAVs, which fly over the area to be measured at a relatively low altitude. A limited radius of curvature of the underground pipelines in the vertical direction may therefore be assumed in the acquisition zone, whereby the orientation of the individual planes that suggests itself is that parallel to the orientation assumed to be approximately constant of the longitudinal portion of the underground pipeline which is in each case of interest.

In this regard, the position and orientation of the camera corresponding to each individual capture must in each case be determined in absolute terms, based on a world coordinate system. This makes it possible to compare the position of the camera directly with reference data serving to determine the spatial position and orientation of the underground pipeline arranged in the acquisition zone.

In a preferred embodiment of the method in accordance with the invention, the portion height of a portion extending in the region of a boundary layer assumes a minimum value and the portion heights of further, in particular the remaining, portions arranged either side of the boundary layer increase from the boundary layer incrementally based on this minimum value, where the region of the boundary layer is determined by subtracting the value of the minimum layer thickness from the depth of the underground pipeline.

This means particularly high depth resolution is available in the region of the boundary layer. Thus, changes that lie within a predetermined and acceptable boundary thickness tolerance may be particularly accurately acquired, while towards the top and bottom the portion heights of the individual portions and thus the quantizing intervals become ever greater. It would naturally also be conceivable for the portion height to become ever greater only in the case of some portions close to the boundary layer, while in the case of portions further away from the boundary layer the relatively large portion heights (relative to the portions close to the boundary layer) remain constant.

As a result of the lower portion height in the region of the boundary layer, on the one hand, high resolution of the depth map is guaranteed in the region of the boundary layer requiring very accurate measurement. At the same time, however, mapping of all the objects present in the acquisition zone and raised above the earth's surface is possible.

A prerequisite for calculating the depth map based on the captured image sequences is accurate determination of the respectively corresponding position and orientation of the camera used for capture. In accordance with the invention, in a further preferred embodiment of the method, the spatial position and orientation of the camera is determined via a global navigation satellite system in conjunction with structure-from-motion techniques, visual odometry or inertial sensors.

During the construction or laying phase of the underground pipelines in question, the positions and orientation of the underground pipelines are conventionally measured very accurately, i.e., with cadastral accuracy (in the one-digit centimeter range) and recorded in a spatial coordinate system, e.g., based on a "world coordinate system". Having recourse to this data makes it possible to use the position and orientation of the underground pipelines in the method in accordance with the invention. In a further preferred embodiment of the method, the orientation of the underground pipeline is determined via measurement data collected while this underground pipeline is being laid.

If an averaged spatial position and orientation of the underground pipeline is used, spatial position and orientation may be represented in each individual capture by one point and one vector. The underground pipeline is thus approximated as a line.

In order to be able to relate the position and orientation of the underground pipelines obtained in this way directly to the positions and orientation of the cameras, in a further preferred embodiment of the method the position and orientation of the cameras and the spatial position and orientation of the underground pipeline is indicated in a common coordinate system, such as in a UTM system or in a Gauß-Krüger coordinate system.

Once the depth map of the acquisition zone to be measured has been compiled and the position and orientation of the underground pipeline in this acquisition zone is likewise known, the actual layer thickness of the soil covering the underground pipeline may be ascertained by local comparison of mutually corresponding reference points of the boundary layer and the underground pipeline. In a particularly preferred embodiment of the method, an actual layer thickness of the soil covering the underground pipeline is measured in the acquisition zone by comparing the depth map with the spatial position and orientation of the underground pipeline in the acquisition zone.

The method in accordance with disclosed embodiments of the invention are methods for the purposes of which large volumes of data have to be processed. Consequently, the methods are as a rule implemented in the form of a computer program. In this regard, the invention also relates to a computer program product that comprises a computer program and may be loaded directly into a memory of a camera and/or a computing unit assigned to the camera, with computer program means for performing all the steps of the method in accordance with disclosed embodiments of the invention when the computer program is run by the camera and/or the computing unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be explained in greater detail with reference to an exemplary embodiment. The drawings are shown by way of example and are intended to illustrate the concept of the invention but not in any way to restrict said invention or to constitute a definitive representation thereof, in which:

FIG. 1 shows a schematic front view of an acquisition zone, which acquisition zone is measured by means of a plane-sweep method in accordance with the prior art;

FIG. 2 shows a schematic front view of an acquisition zone, where the acquisition zone is measured via a plane-sweep method in accordance with the invention.

DETAILED DESCRIPTION OF THE EXEMPLARY EMBODIMENTS

Figure 3:
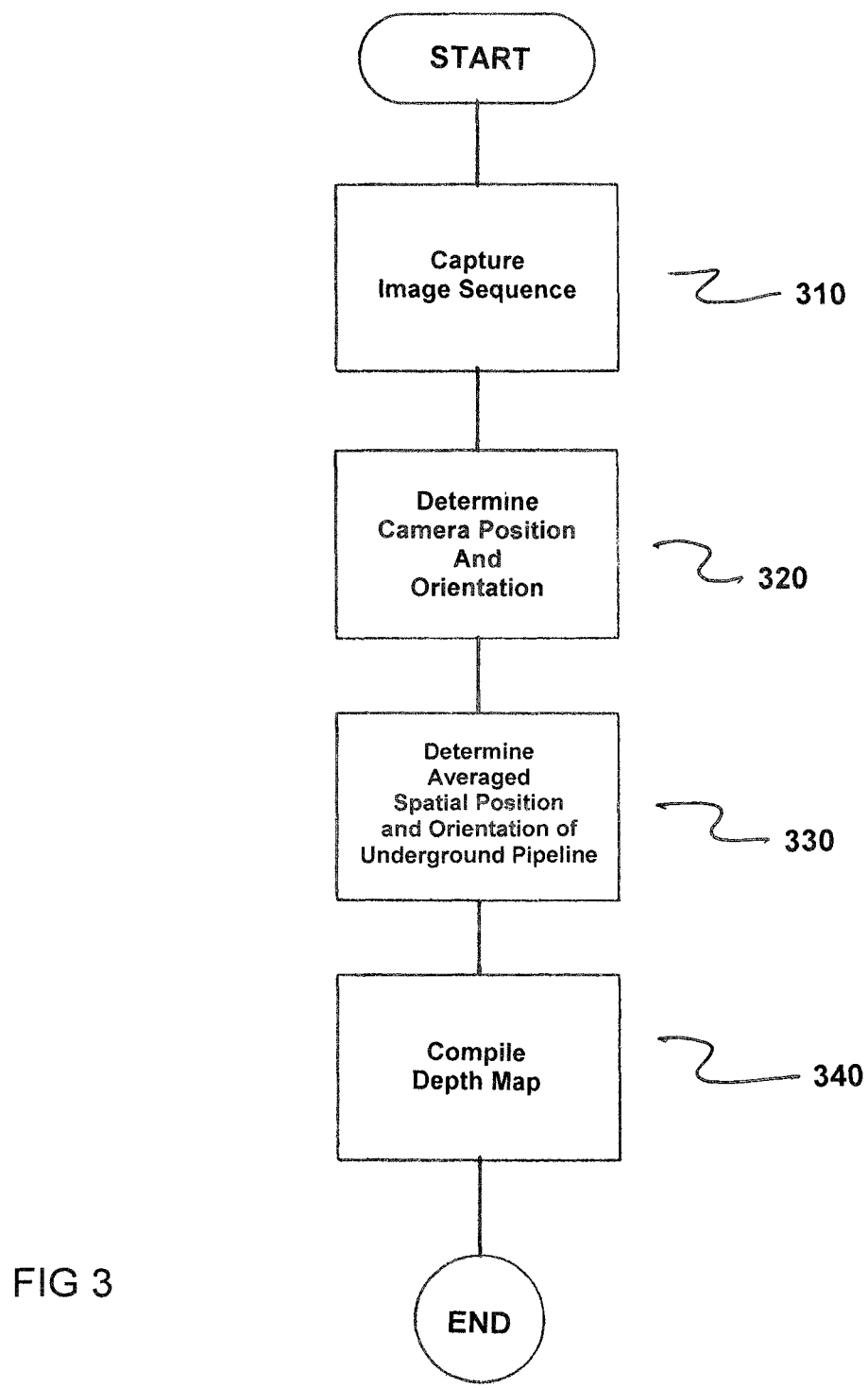
FIG. 3 is a flowchart of the method in accordance with the invention.

FIG. 1 shows a schematic view of an acquisition zone 1 of the earth's surface. Below a boundary layer 7, which extends between the ground and the atmosphere and thus represents a portion of the earth's surface, an underground pipeline 2 with a specific spatial orientation 4 is arranged. Above the boundary layer 7 are certain raised objects, represented in this specific case as trees.

A camera 3 is in the process of taking an image of the acquisition zone 1, where the camera 3 is mounted on a UAV flying over the acquisition zone at a given height and is directed towards the earth's surface. The conventional plane-sweep method, which is outlined in FIG. 1, then uniformly subdivides a depth range 5, which extends from the camera 3 towards the earth's surface, into equidistant portions via a predetermined number of planes 6. To enable adequate acquisition of irregularities in the height profile of the boundary layer 7, this depth range 5 must extend further than merely from the camera 3 to the boundary layer 7. The depth range 5 should therefore extend at least as far as into the depth range of the underground pipeline 2. The planes 6, by which the depth range 5 is quantized, extend parallel to one another, but not parallel to the orientation 4 of the underground pipeline 2 or parallel to the boundary layer 7.

The number of portions i available for quantizing the depth range 5 is limited, on the one hand, by the computing power of an evaluation unit, which performs the calculations for compiling the depth map and, on the other hand, also by the available memory space of this evaluation unit and is conventionally in the range between 200 and 300. Owing to the accuracy with which the depth map of the acquisition zone 1 has to be compiled, a portion height $D_i$ of the individual portions should be in the lower, one-digit centimeter range. If the portion height $D_i$ amounts, for example, to 1 cm, a depth range 5 of only 2 m can be covered. Objects raised above the boundary layer 7, such as trees or buildings, may however far exceed this 2 m range. In addition, even the incline or slope of the terrain can exceed this depth range.

FIG. 2, on the other hand, outlines the method in accordance with the invention for compiling a depth map of the acquisition zone 1. Here, the acquisition zone 5 is likewise subdivided into portions i via the planes 6. However, on the one hand, the planes 6 extend parallel to the orientation 4 of the underground pipeline 2 while, on the other hand, the portion heights $D_i$ of the individual portions i are not constant.

The planes 6 are oriented and the portion heights $D_i$ selected in the plane-sweep method in accordance with the invention such that initially all the position and spatial orientation 4 of the underground pipeline 2 is determined from reference data, in the specific exemplary embodiment from cadastral data from the construction phase. Viewed from the camera 3, the statutorily specified minimum layer thickness T is then subtracted from the depth $T_2$ of the pipeline 2 ascertained in this way, in order to estimate the depth $T_7$, and thus the region, of the boundary layer 7 relative to the origin of the depth range 5.

In this range, a minimum portion height $D_i$ is assigned to a portion i extending parallel to the spatial orientation 4 of the underground pipeline 2. The portion heights $D_i$ of all the other portions i extending above and below this portion i arranged in the region of the boundary layer 7 increase incrementally when observed from the boundary layer 7. In the region of the boundary layer 7, in particular in the region of the admissible tolerance values for the layer thickness of the soil covering the underground pipeline, a very detailed depth map may thus be compiled, with high depth resolution. The depth range 5 may in this case be significantly greater than in the conventional prior art method, because a particularly small portion height $D_i$, and thus high depth map accuracy, need only be present in the region of the boundary layer 7 and the portion heights $D_i$ of the remaining portions are sometimes markedly greater than this minimum portion height $D_i$.

FIG. 3 is a flowchart of the method for compiling a depth map of an acquisition zone 1 at the Earth's surface of, where an underground pipeline 2 is arranged in the acquisition zone 1. The method comprises capturing at least one image sequence using at least one camera 3, as indicated in step 310. In accordance with the method of the invention, the image sequence comprises a plurality of at least partly overlapping individual captures of the acquisition zone 1.

Next, the position and orientation of the at least one camera corresponding to each individual capture is determined, as indicated in step 320.

Next, a preferably averaged spatial position and orientation 4 of the underground pipeline 2 arranged in the acquisition zone 1 is determined from reference data, as indicated in step 330. The depth map of the acquisition zone 1 is now compiled via a plane-sweep method based on the plurality of at least partly overlapping individual captures and respectively associated camera poses, as indicated in step 340.

In accordance with the method of the invention, the maximum depth range 5 of the plane sweep method is subdivided adaptively into a total of N portions i, via a predetermined number of planes 6 spaced differently from one another and extending parallel to one another, such that a predetermined portion height $D_i$ is assigned to each individual one of the N portions i, and the orientation of the predetermined number of planes 6 extends parallel to the orientation 4 of the underground pipeline 2.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for compiling a depth map of an acquisition zone at a surface of the Earth, an underground pipeline being arranged in said acquisition zone, the method comprising:
   capturing at least one image sequence using at least one camera, said image sequence comprising a plurality of at least partly overlapping individual captures of the acquisition zone;
   determining a position and orientation of the at least one camera corresponding to each individual capture;
   determining an averaged spatial position and orientation of the underground pipeline arranged in the acquisition zone from reference data; and
   compiling the depth map of the acquisition zone via a plane-sweep method based on the plurality of at least partly overlapping individual captures and respectively associated camera poses;
   wherein a maximum depth range of the plane-sweep method is subdivided adaptively into a total of N portions, via a predetermined number of planes spaced differently from one another and extending parallel to one another, such that a predetermined portion height is assigned to each individual one of the N portions; and
   wherein the orientation of the predetermined number of planes extends parallel to the orientation of the underground pipeline.

2. The method as claimed in claim 1, wherein a portion height of a portion extending in a region of a boundary layer assumes a minimum value and portion heights of further remaining portions arranged at either side of the boundary layer increase from the boundary layer incrementally based on said minimum value; and wherein the region of the boundary layer is determined by subtracting a value of the minimum layer thickness from a depth of the underground pipeline.

3. The method as claimed in claim 2, wherein a spatial position and orientation of the at least one camera is determined via a global navigation satellite system in conjunction with one of (i) structure-from-motion techniques, (ii) visual odometry and (iii) inertial sensors.

4. The method as claimed in claim 2, wherein the orientation of the underground pipeline is determined via measurement data collected while said underground pipeline is being laid.

5. The method as claimed in claim 1, wherein a spatial position and orientation of the camera is determined via a global navigation satellite system in conjunction with one of (i) structure-from-motion techniques, (ii) visual odometry and (iii) inertial sensors.

6. The method as claimed in claim 1, wherein the orientation of the underground pipeline is determined via measurement data collected while said underground pipeline is being laid.

7. The method as claimed in claim 1, wherein the orientation of the underground pipeline is determined via measurement data collected while said underground pipeline is being laid.

8. The method as claimed in claim 1, wherein an averaged spatial position and orientation of the underground pipeline is represented in each individual capture by one point and one vector.

9. The method as claimed in claim 1, wherein the position and orientation of the at least one camera and the spatial position and orientation of the underground pipeline is indicated in a common coordinate system.

10. The method as claimed in claim 9, wherein the common coordinate system comprises one of (i) a Universal Transverse Mercator (UTM) system and (ii) a Gauß-Krüger coordinate system.

11. The method as claimed in claim 1, wherein an actual layer thickness of soil covering the underground pipeline is measured in the acquisition zone by comparing the compiled depth map with the spatial position and orientation of the underground pipeline in the acquisition zone.

12. The method as claimed in claim 1, wherein the maximum depth range of the plane-sweep method is subdivided adaptively as a function of a predetermined minimum layer thickness for soil covering the underground pipeline.

13. A non-transitory computer program product encoded with a computer program loadable directly into at least one of a memory of a camera and a computing unit assigned to the camera which, when executed by the camera causes compilation of a depth map of an acquisition zone at a surface of the Earth, an underground pipeline being arranged in said acquisition zone, the computer program comprising:
   program code for capturing at least one image sequence using at least one camera, said image sequence comprising a plurality of at least partly overlapping individual captures of the acquisition zone;
   program code for determining a position and orientation of the at least one camera corresponding to each individual capture;
   program code for determining an averaged spatial position and orientation of the underground pipeline arranged in the acquisition zone from reference data; and
   program code for compiling the depth map of the acquisition zone via a plane-sweep method based on the plurality of at least partly overlapping individual captures and respectively associated camera poses;
   wherein a maximum depth range of the plane-sweep method is subdivided adaptively into a total of N portions, via a predetermined number of planes spaced differently from one another and extending parallel to one another, such that a predetermined portion height is assigned to each individual one of the N portions; and
   wherein the orientation of the predetermined number of planes extends parallel to the orientation of the underground pipeline.

* * * * *